United States Patent [19]

Matsumura et al.

[11] 4,351,936

[45] Sep. 28, 1982

[54] METHOD FOR REDUCING THE TERMINAL CARBOXYL GROUP CONTENT OF A SATURATED POLYESTER, A SATURATED POLYESTER HAVING A REDUCED TERMINAL CARBOXYL GROUP CONTENT, AND A MOLDED ARTICLE COMPOSED OF SUCH A SATURATED POLYESTER

[75] Inventors: Shunichi Matsumura, Hachioji; Hiroo Inata, Hino; Tsuto Morinaga, Sagamihara, all of Japan

[73] Assignee: Teijin Limited, Osaka, Japan

[21] Appl. No.: 213,051

[22] Filed: Dec. 4, 1980

[30] Foreign Application Priority Data

Dec. 5, 1979 [JP] Japan ................... 54-156893
Apr. 21, 1980 [JP] Japan ................... 55-51784
Jun. 18, 1980 [JP] Japan ................... 55-81305

[51] Int. Cl.$^3$ ................... C08G 63/44; C08G 73/16
[52] U.S. Cl. ................... 528/289; 525/437; 525/440; 525/443; 528/288
[58] Field of Search ................... 525/437, 440, 443; 528/288, 289

[56] References Cited

U.S. PATENT DOCUMENTS

| | | | |
|---|---|---|---|
| 3,231,577 | 1/1966 | Walles | 528/289 |
| 3,235,507 | 2/1966 | Pollack et al. | 528/289 |
| 3,433,770 | 3/1969 | Shima et al. | 528/305 |
| 3,444,141 | 5/1969 | Shima | 528/309 |
| 3,787,370 | 1/1974 | Shima et al. | 528/274 |
| 3,937,716 | 2/1976 | Lewis et al. | 528/289 |
| 3,959,215 | 5/1976 | Schneider | 528/289 |
| 3,984,379 | 10/1976 | Oka et al. | 528/274 |
| 4,200,731 | 4/1980 | Massey et al. | 528/289 |
| 4,291,152 | 9/1981 | Inata et al. | 528/289 |

*Primary Examiner*—Ronald W. Griffin
*Attorney, Agent, or Firm*—Sherman & Shalloway

[57] ABSTRACT

The present invention provides a process for producing a saturated polyester having a reduced terminal carboxyl group content, which comprises reacting a carboxyl-terminated, substantially linear, fiber-forming saturated polyester with a monocyclic imino ether compound of the formula

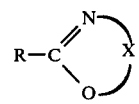

(1)

wherein R is a group of the following formula

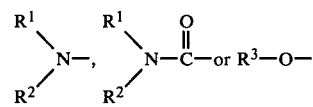

in which $R^1$ is a hydrogen atom or a monovalent organic group non-reactive with the saturated polyester under the reaction conditions, $R^2$ and $R^3$ are a monovalent organic group non-reactive with the saturated polyester under the reaction conditions, and $R^1$ and $R^2$ may be bonded to each other, to form together with the nitrogen atom a 5- or 6-membered ring which is non-reactive with the saturated polyester under the reaction conditions; and X is a divalent organic group non-reactive with the saturated polyester under the reaction conditions, which has two or three ring-member carbon atoms constituting the imino ether ring, at an elevated temperature.

The present invention also relates to a process for producing a molded article of a saturated polyester having a reduced terminal carboxyl group content which comprises intimately contacting a carboxyl-terminated, substantially linear, fiber-forming saturated polyester with a monocyclic imino ether compound represented by the formula (1) in a melt-molding machine at a temperature above the temperature at which the saturated polyester melts, or heat-treating a molded article composed of a carboxyl-terminated, substantially linear, fiber-forming saturated polyester with a monocyclic imino ether compound represented by the formula (1) at an elevated temperature at which the molded article can retain its form.

22 Claims, No Drawings

METHOD FOR REDUCING THE TERMINAL CARBOXYL GROUP CONTENT OF A SATURATED POLYESTER, A SATURATED POLYESTER HAVING A REDUCED TERMINAL CARBOXYL GROUP CONTENT, AND A MOLDED ARTICLE COMPOSED OF SUCH A SATURATED POLYESTER

This invention relates to the decreasing of the terminal carboxoyl group content of a saturated polyester. More specifically, this invention relates to rapid decreasing of the terminal carboxyl group content of a saturated polyester by reacting it with a monocyclic imino ether having a specified structure.

Linear saturated polyesters, particularly polyethylene terephthalate and polytetramethylene terephthalate, find extensive application as fibers, films, plastics, etc. because of their excellent properties.

Wet heat stability is one of the important properties among the properties of these polyesters. It is known that wet heat stability depends upon the amount of terminal carboxyl groups of a polyester, and the lower the terminal carboxyl group content is, the better is the wet heat stability of the polyester.

Various proposals have been made in the past for a method of reducing the amount of the terminal carboxyl groups of a polyester. These proposals include, for example, a method which comprises reacting the polyester with an epoxy compound such as phenyl glycidyl ether or N-glycidyl phthalimide (see Japanese Laid-Open Patent Publication No. 6098/79), and a method which comprises reacting the polyester with a carbodiimide such as dicyclohexyl carbodiimide (see Japanese Laid-Open Patent Publication No. 95517/75). These methods however, have various defects. For example, the epoxy compound has low reactivity with the polyester, and the reaction requires a relatively long period of time. Thus, for example, in a melt-molding machine in which the residence time cannot be so much prolonged, it is difficult to produce a polyester whose carboxyl group content is reduced greatly to the desired degree. The carbodiimide, on the other hand, has the defect of coloring the polyester.

There have also been known a method which comprises reacting the polyester with a diaryl carbonate such as diphenyl carbonate (see U.S. Pat. No. 3,444,141), a method which comprises reacting the polyester with a diaryl ester of oxalic acid or malonic acid (see U.S. Pat. No. 3,433,770), a method which comprises reacting the polyester with a polyalkylene oxalate such as polyethylene oxalate (see U.S. Pat. No. 3,637,910), and a method which comprises reacting the polyester with an ortho-aryl ester of an aromatic or aliphatic dicarboxylic acid (see U.S. Pat. No. 3,984,379).

These methods are characteristic in that because the reagents used are difunctional compounds and therefore have the ability to bond the molecular chains of the polymer to each other, these methods basically give polyesters having an increased degree of polymerization as well as a reduced carboxyl group content. Moreover, these methods give rise to by-products.

A method for reducing the decomposition of a fiber-forming polyester is known which comprises mixing phenylene-bisoxazoline of the formula

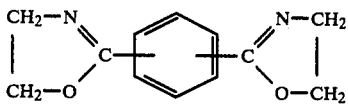

wherein the hydrogen atoms may be replaced by an alkyl or aryl group, with the fiber-forming polyester, and immediately then spinning the polyester in the presence of the phenylenebisoxazoline (see Japanese Laid-Open Patent Publication No. 59,525/75). It is seen from the specification, especially Examples, of this patent document that this method apparently seems to serve to reduce the decomposition of the polyester, but the carboxyl group content of the resulting polyester fibers cannot be much lower than the carboxyl group content of the polyester before spinning. Investigations of the present inventors have shown that the phenylene-bisoxazoline is not reactive enough with the terminal carboxyl groups of the polyester.

It is an object of this invention to provide a process for rapidly reducing the terminal carboxyl group content of a substantially linear, fiber-forming saturated polyester.

Another object of this invention is to provide a process for rapidly reducing the terminal carboxyl group content of a substantially linear, fiber-forming saturated polyester without substantial formation of by-products.

Still another object of this invention is to provide a method for rapidly producing a saturated polyester having a reduced terminal carboxyl group content, which comprises rapidly reducing the terminal carboxyl group content of a substantially linear, fiber-forming saturated polyester without bonding the molecular chains of the polymer to each other and therefore without causing a drastic difference in the degree of polymerization of the starting saturated polyester and the produced saturated polyester.

Yet another object of this invention is to provide a method for rapidly reducing the terminal carboxyl group of a saturated polyester, which can be carried out under atmospheric and elevated pressures.

A further object of this invention is to provide a saturated polyester having a reduced terminal carboxyl group content.

Another object of this invention is to provide a saturated polyester having excellent wet heat stability.

An additional object of this invention is to provide a molded article composed of a saturated polyester having a reduced terminal carboxyl group content, and a method for rapidly producing such a molded article by performing the reaction of decreasing the terminal carboxyl group content of the saturated polyester within a melt-molding machine.

Other objects and advantages of this invention will become apparent from the following description.

According to the most basic concept of this invention, the objects and advantages of this invention are achieved by a process for producing a saturated polyester having a reduced terminal carboxyl group content, which comprises reacting a substantially linear, fiber-forming saturated polyester with a monocyclic imino ether compound of the following formula

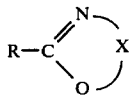

wherein R is a group of the following formula

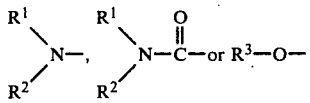

in which $R^1$ is a hydrogen atom or a monovalent organic group non-reactive with the saturated polyester under the reaction conditions, $R^2$ and $R^3$ are a monovalent organic group non-reactive with the saturated polyester under the reaction conditions, and $R^1$ and $R^2$ may be bonded to each other to form together with the nitrogen atom a 5- or 6-membered ring which is non-reactive with the saturated polyester under the reaction conditions; and X is a divalent organic group non-reactive with the saturated polyester under the reaction conditions, which has two or three ring-member carbon atoms constituting the imino ether ring, at an elevated temperature.

The invention is described in greater detail below.

[A] Saturated polyesters

The saturated polyester used in the present invention may include any of aromatic polyesters, aliphatic polyesters, aromatic polyester ethers, etc. of which constituent components do not substantially have an ethylenically unsaturated bond.

The saturated polyesters used in this invention contain terminal carboxyl groups and are substantially linear, fiber-forming. Such saturated polyesters and methods for production thereof are widely known from many techniques which have been built up in the art.

Preferred aromatic polyesters are, for example, those composed of aromatic dicarboxylic acids as a main acid component and alkylene glycols or both alkylene glycols and polyoxyalkylene glycols as a main glycol component.

Examples of aromatic dicarboxylic acids are terephthalic acid, isophthalic acid, naphthalenedicarboxylic acid, diphenyldicarboxylic acid, diphenylsulfonedicarboxylic acid, diphenoxyethanedicarboxylic acid, diphenyletherdicarboxylic acid, methylterephthalic acid, and methylisophthalic acid.

Examples of the alkylene glycols are polymethylene glycols having 1 to 10 carbon atoms such as ethylene glycol, trimethylene glycol, tetramethylene glycol, hexamethylene glycol and decamethylene glycol, and cyclohexane dimethylol.

Examples of the polyoxyalkylene glycols are polyoxyethylene glycol, polyoxypropylene glycol, polyoxytrimethylene glycol, polyoxytetramethylene glycol, and copolymerized polyoxyalkylene glycols having at least two of these oxyalkylene units as recurring units.

The aromatic polyesters having an aromatic dicarboxylic acid as a main acid component and an alkylene glycol as a main glycol component are homopolymers or copolymers derived from at least one aromatic dicarboxylic acid exemplified above as the main acid component and at least one alkylene glycol exemplified above as the main glycol component, and include, for example, polyethylene terephthalate, polytrimethylene terephthalate, polytetramethylene terephthalate, polyethylene-2,6-naphthalenedicarboxylate, and polyethylene terephthalate-isophthalate.

Aromatic polyesters derived from an aromatic dicarboxylic acid as a main component and an alkylene glycol and a polyoxyalkylene glycol as a main glycol component are generally called "polyester elastomers" because of their high elasticity. They are copolymers derived from at least one aromatic dicarboxylic acid exemplified above as the acid component and at least one alkylene glycol exemplified above and at least one polyoxyalkylene glycol exemplified above as the main glycol component. For example, there can be cited a polyester elastomer having terephthalic acid as the acid component and tetramethylene glycol and polyoxytetramethylene glycol as the glycol component.

Polyester elastomers in which the polyoxyalkylene glycol has an average molecular weight of 500 to 5,000, preferably 600 to 4,000, especially preferably 800 to 3,000 are preferred. Also, advantageously used are polyester elastomers in which the proportion of the polyoxyalkylene moiety attributed to the polyoxyalkylene glycol used is 5 to 85% by weight, preferably 10 to 80% by weight, especially preferably 15 to 75% by weight, based on the polyester elastomer.

The aromatic polyesters that can be used in this invention are not limited to those derived from aromatic dicarboxylic acids as the acid component and alkylene glycols or both alkylene glycols and polyoxyalkylene glycols as the glycol component, and may include those which are derived from these compounds as the main component and other subsidiary components.

Examples of such subsidiary components include acid components, for example aliphatic dicarboxylic acids such as succinic acid, adipic acid, sebacic acid, decanedicarboxylic acid and dodecanedicarboxylic acid, alicyclic dicarboxylic acids such as cyclohexanedicarboxylic acid; ε-hydroxycaproic acid, hydroxybenzoic acid and hydroxyethoxybenzoic acid; trifunctional or higher compounds such as trimethylol propane, pentaerythritol, trimellitic acid and pyromellitic acid; and monofunctional compounds such as benzoylbenzoic acid and diphenylcarboxylic acid.

The subsidiary acid component may be included in an amount of not more than 20 mole%, preferably not more than 15 mole%, especially preferably not more than 10 mole%, based on the total acid component. The trifunctional or higher compound may be incorporated in an amount of usually not more than 1 mole% of the total acid component, in which amount the aromatic polyester is maintained substantially linear. The use of monofunctional compounds which block terminal carboxyl groups is insignificant unless there is some special reason for it. But those which block terminal hydroxyl groups can be used without any substantial influence on the reaction carried out in accordance with this invention.

Preferred aromatic polyesters used in this invention are a polyester derived from terephthalic acid as a main acid component and ethylene glycol, tetramethylene glycol or hexamethylene glycol as a main glycol component (i.e., having an ethylene terephthalate, tetramethylene terephthalate or hexamethylene terephthalate recurring unit), and a polyester derived from terephthalic acid as a main acid component and tetramethylene glycol and polytetramethylene glycol as a main glycol component.

These aromatic polyesters can be produced by an ester-interchange method or a direct polymerization method in the presence of known catalysts in a manner known per se. For example, a polyester elastomer can be produced by heating an aromatic dicarboxylic acid or its ester-forming derivative and tetramethylene glycol and polytetramethylene glycol in the presence of a titanium catalyst such as titanium tetrabutoxide to 180° to 250° C., and then gradually increasing the degree of pressure reduction.

Preferred aliphatic polyesters are, for example, those composed of aliphatic dicarboxylic acids as a main acid component and alkylene glycols as a main glycol component.

Examples of the aliphatic dicarboxylic acids are succinic acid, adipic acid, sebacic acid, decanedicarboxylic acid, dodecanedicarboxylic acid and cyclohexanedicarboxylic acid. As the alkylene glycols, the same examples as given above will apply.

The aliphatic polyester is a homopolymer or copolymer composed of at least one of the above aliphatic dicarboxylic acids as an acid component and at least one of the above-exemplified alkylene glycols as a glycol component, and includes, for example, polyethylene adipate, polyethylene sebacate and polyethylene cyclohexanedicarboxylate.

The aliphatic polyester may include a subsidiary component. Examples of the subsidiary component are aromatic dicarboxylic acids (as exemplified hereinabove) which can be the main acid components of aromatic polyesters, epsilon-hydroxycaproic acid, hydroxybenzoic acid, hydroxyethoxybenzoic acid, trifunctional or higher compounds such as trimethylolpropane, and monofunctional compounds such as benzoylbenzoic acid.

These subsidiary components may be used in the same amounts and for the same purpose as already described hereinabove with regard to the aromatic polyesters.

Preferred aromatic polyester ethers are, for example, those polyesters which comprise hydroxyalkyleneoxybenzoic acid as a main recurring unit. These polyester ethers can be produced in a manner known per se from hydroxybenzoic acid, hydroxyalkyleneoxybenzoic acids such as hydroxyethoxybenzoic acid or hydroxytetramethyleneoxybenzoic acid, or the functional derivatives of these at their carboxyl groups, such as the esters.

These aromatic polyester ethers may include subsidiary components such as aromatic dicarboxylic acids, aliphatic dicarboxylic acids, trifunctional or higher compounds and monofunctional compounds which have already been exemplified hereinabove.

The saturated polyester used in this invention contains terminal carboxyl groups, and is substantially linear, fiber-forming.

That the saturated polyester used in this invention has terminal carboxyl groups should not be construed to mean that all terminal groups are carboxyl groups, nor that the concentration of the terminal carboxyl groups is higher than that of terminal hydroxyl groups. As described in detail hereinbelow, the reaction of this invention results in effective blocking of the terminal carboxyl groups of a saturated polyester with the monocyclic imino ether, and therefore, according to this invention, a saturated polyester having a reduced carboxyl content can be produced advantageously from a saturated polyester having terminal carboxyl groups.

As the saturated polyester used in this invention, there can be specifically cited polyesters, such as polyethylene terephthalate, having more hydroxyl groups than terminal carboxyl groups which are obtained by an ordinary method for production of a saturated polyester, using a stoichiometrically larger amount of the glycol component than the acid component, or polyesters having relatively increased content of terminal carboxyl groups as a result of experiencing a heat history during or after polymerization.

One characteristic feature of the present invention is that because the monocyclic imino ether reacts effectively and rapidly with the terminal groups of the saturated polyester, a saturated polyester having a reduced terminal carboxyl group content can be rapidly produced even from a saturated polyester having a lower terminal carboxyl group content than the terminal hydroxyl group content.

Advantageously, a saturated polyester having a terminal carboxyl group concentration of not more than 100 equivalents, preferably not more than 50 equivalents, per $10^6$ g of polymer is used in the process of this invention.

The "fiber-forming" property of the polyester denotes its property of being molded into a fibrous form as a result of having some degree of polymerization, irrespective of the properties, etc. of the resulting fibers. Accordingly, solution viscosity, which depends upon the degree of polymerization, can be a measure of the fiber-forming property of the saturated polyester.

Aromatic polyesters having aromatic dicarboxylic acids as a main acid component and alkylene glycols as a main glycol component, aliphatic polyesters or aromatic polyester ethers preferably have an intrinsic viscosity, measured at 35° C. in ortho-chlorophenol, of at least 0.3, especially at least 0.4.

Aromatic polyesters having aromatic dicarboxylic acids as a main acid component and alkylene glycols and polyoxyalkylene glycols as a main glycol component preferably have a reducing viscosity ($\eta sp/c$), determined at 35° C. for a solution of polymer in ortho-chlorophenol in a concentration (c) of 1.2 g/dl, of at least 0.5, especially at least 0.6, above all at least 0.8.

From the viewpoint of the properties, uses, etc. of the resulting saturated polyester having a reduced terminal carboxyl group content, the starting saturated polyester preferably has a melting point of at least 170° C.

[B] Monocyclic imino ether

The monocyclic imino ether used in this invention is represented by the following formula (1)

(1)

wherein R is a group of the following formula

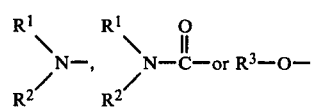

in which $R^1$ is a hydrogen atom or a monovalent organic group non-reactive with the saturated polyester under the reaction conditions, $R^2$ and $R^3$ are a monovalent organic group non-reactive with the saturated polyester under the reaction conditions, and R¹ and R² may be bonded to each other to form together with the nitrogen atom a 5- or 6-membered ring which is non-reactive with the saturated polyester under the reaction conditions; and X is a divalent organic group non-reactive with the saturated polyester under the reaction conditions, which has two or three ring-member carbon atoms constituting the imino ether ring.

Examples of the monovalent organic group represented by R¹ or R² in the above formula [I] include alkyl groups having 1 to 10 carbon atoms such as methyl, ethyl, propyl, butyl, hexyl and decyl; aryl groups having 6 to 12 carbon atoms such as phenyl, tolyl and naphthyl; cycloalkyl groups having 5 to 12 carbon atoms such as cyclopentyl and cyclohexyl; aralkyl groups having 6 to 20 carbon atoms such as benzyl and phenethyl; alkenyl groups having 3 to 10 carbon atoms such as allyl, methallyl and crotyl; and alkyl groups substituted by a heterocyclic group in which the heterocyclic group is further substituted by an alkenyl group, such as cyanur, isocyanur, phenoxyphenyl and phenylsulfonylphenyl.

R¹ and R² may be bonded to each other to form a 5- or 6-membered ring (non-reactive with the saturated polyester under the reaction conditions) together with the nitrogen atom to which they are bonded.

Methylene, ethylene and methylene and ethylene substituted by an alkyl group having 1 to 10 carbon atoms may be cited as examples of the group resulting from the bonding of R¹ and R² to each other.

R¹ preferably represents hydrogen, ethyl, propyl, butyl, pentyl, hexyl and phenyl, and hydrogen and ethyl are especially preferred. R² preferably represents ethyl, propyl, butyl, pentyl, hexyl and phenyl, and ethyl and phenyl are especially preferred.

Examples of the monovalent organic group for R³ which is non-reactive with the saturated polyester under the reaction conditions include alkyl groups having 1 to 10 carbon atoms such as methyl, ethyl, propyl, butyl, hexyl and decyl; cycloalkyl groups having 5 to 12 carbon atoms such as cyclopentyl and cyclohexyl; aralkyl groups having 6 to 20 carbon atoms such as benzyl and phenethyl; alkenyl groups having 3 to 10 carbon atoms such as allyl, methallyl and crotyl; and alkyl groups substituted by a heterocyclic group in which the heterocyclic group is further substituted by an alkenyl group, such as cyanur, isocyanur, phenoxyphenyl and phenylsulfonylphenyl.

R³ preferably represents ethyl, propyl, butyl, pentyl and hexyl, and ethyl is especially preferred.

Examples of the divalent organic group for X include ethylene, trimethylene, substituted ethylene and substituted trimethylene. As is readily appreciated from the definition of X above, the substituent on X should be non-reactive with the saturated polyester under the reaction conditions. Examples of the substituent include alkyl groups having 1 to 10 carbon atoms, aryl groups having 6 to 12 carbon atoms, cycloalkyl groups having 5 to 12 carbon atoms, and aralkyl groups having 7 to 20 carbon atoms.

Preferably, X represents ethylene and trimethylene.

By the definition of R, the monocyclic iminoethers of formula (1) can be divided into the following three groups.

One group of the compounds of formula (1) is represented by the following formula

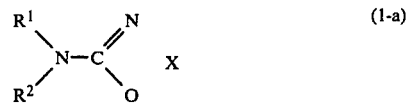

wherein R¹, R², and X are as defined in formula (1).

Another group of the compounds of formula (1) is represented by the following formula

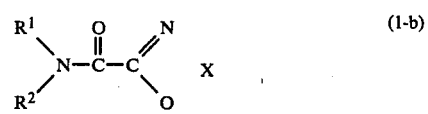

wherein R¹, R² and X are as defined in formula (1).

Still another group of the compounds of formula (1) is represented by the following formula

wherein R³ and X are as defined in formula (1).

It is to be understood that any compounds belonging to any one of the formulae (1-a), (1-b) and (1-c) constitute one group of the above formula (1) in achieving the objects of this invention in that they rapidly react with the carboxyl groups of the saturated polyester to give a saturated polyester having a reduced terminal carboxyl groups content and commonly have an imino ether ring forming the basis of such reaction.

The compounds of formula (1-a) and (1-b) are preferred in this invention, and those of formula (1-b) are especially preferred.

Specific examples of preferred compounds of general formula (1) are given below. When X has two ring-member carbon atoms (namely, when the imino ether ring is 5-membered), these compounds are termed 2-oxazolines, and when X has three ring-member carbon atoms (namely, when the imino ether ring is 6-membered), they are termed 5,6-dihydro-4H,1,3-oxazines.

2-Oxazolines of formula (1-a)

2-N-Methylamino-2-oxazoline,
2-N-ethylamino-2-oxazoline,
2-N-propylamino-2-oxazoline,
2-N-butylamino-2-oxazoline,
2-N-pentylamino-2-oxazoline,
2-N-hexylamino-2-oxazoline,
2-N-heptylamino-2-oxazoline,
2-N-octylamino-2-oxazoline,
2-N-allylamino-2-oxazoline,
2-N-phenylamino-2-oxazoline,
2-N-naphthylamino-2-oxazoline,
2-N,N-dimethylamino-2-oxazoline,
2-N,N-diethylamino-2-oxazoline,
2-N,N-dipropylamino-2-oxazoline,
2-N,N-dibutylamino-2-oxazoline,
2-N,N-dihexylamino-2-oxazoline,
2-N,N-diallylamino-2-oxazoline,
2-N,N-phenylmethylamino-2-oxazoline,
2-N,N-phenylethylamino-2-oxazoline,
2-N,N-diphenylamino-2-oxazoline,
2-N-phenylamino-4,4-dimethyl-2-oxazoline, and
2-N,N-diethylamino-4,4-dimethyl-2-oxazoline.

Among these compounds, 2-N,N-diethylamino-2-oxazoline, 2-N,N-dipropylamino-2-oxazoline and 2-N,N-dibutylamino-2-oxazoline are preferred.

5,6-Dihydro-4H,1,3-oxazines of formula (1-a)

2-N-Methylamino-5,6-dihydro-4H,1,3-oxazine,
2-N-ethylamino-5,6-dihydro-4H,1,3-oxazine,
2-N-propylamino-5,6-dihydro-4H,1,3-oxazine,
2-N-butylamino-5,6-dihydro-4H,1,3-oxazine,
2-N-pentylamino-5,6-dihydro-4H,1,3-oxazine,
2-N-hexylamino-5,6-dihydro-4H,1,3-oxazine,
2-N-heptylamino-5,6-dihydro-4H,1,3-oxazine,
2-N-octylamino-5,6-dihydro-4H,1,3-oxazine,
2-N-allylamino-5,6-dihydro-4H,1,3-oxazine,
2-N-phenylamino-5,6-dihydro-4H,1,3-oxazine,
2-N-naphthylamino-5,6-dihydro-4H,1,3-oxazine,
2-N,N-dimethylamino-5,6-dihydro-4H,1,3-oxazine,
2-N,N-diethylamino-5,6-dihydro-4H,1,3-oxazine,
2-N,N-dipropylamino-5,6-dihydro-4H,1,3-oxazine,
2-N,N-dibutylamino-5,6-dihydro-4H,1,3-oxazine,
2-N,N-dihexylamino-5,6-dihydro-4H,1,3-oxazine,
2-N,N-diallylamino-5,6-dihydro-4H,1,3-oxazine,
2-N,N-phenylmethylamino-5,6-dihydro-4H,1,3-oxazine,
2-N,N-phenylethylamino-5,6-dihydro-4H,1,3-oxazine, and
2-N,N-diphenylamino-5,6-dihydro-4H,1,3-oxazine.

Among these compounds, 2-N,N-diethylamino-5,6-4H,1,3-oxazine, 2-N,N-dipropylamino-5,6-dihydro-4H,1,3-oxazine, and 2-N,N-dibutylamino-5,6-dihydro-4H,1,3-oxazine are preferred.

The compound of formula (1-a) can be easily produced by heating a compound of the following formula

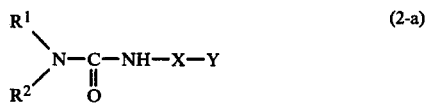

wherein $R^1$, $R^2$ and X are as defined in formula (1), and Y is a halogen atom such as Cl or Br in water, or treating it in the presence of a basic compound such as sodium hydroxide or potassium hydroxide to perform cyclization accompanied by dehydrohalogenation.

2-Oxazolines of formula (1-b)

2-Methylcarbamoyl-2-oxazoline.
2-ethylcarbamoyl-2-oxazoline,
2-propylcarbamoyl-2-oxazoline,
2-ethylcarbamoyl-2-oxazoline,
2-propylcarbamoyl-2-oxazoline,
2-isopropylcarbamoyl-2-oxazoline,
2-butylcarbamoyl-2-oxazoline,
2-pentylcarbamoyl-2-oxazoline,
2-hexylcarbamoyl-2-oxazoline,
2-octylcarbamoyl-2-oxazoline,
2-cyclohexylcarbamoyl-2-oxazoline,
2-phenylcarbamoyl-2-oxazoline,
2-tolylcarbamoyl-2-oxazoline,
2-naphthylcarbamoyl-2-oxazoline,
2-dimethylcarbamoyl-2-oxazoline,
2-diethylcarbamoyl-2-oxazoline,
2-methylethylcarbamoyl-2-oxazoline,
2-phenylmethylcarbamoyl-2-oxazoline,
2-phenylethylcarbamoyl-2-oxazoline,
2-diphenylcarbamoyl-2-oxazoline,
2-carbamoyl-4,4-dimethyl-2-oxazoline,
2-ethylcarbamoyl-4,4-dimethyl-2-oxazoline,
2-phenylcarbamoyl-4,4-dimethyl-2-oxazoline,
2-dimethylcarbamoyl-4,4-dimethyl-2-oxazoline,
2-diethylcarbamoyl-4,4-dimethyl-2-oxazoline,
2-allylcarbamoyl-2-oxazoline,
2-diallylcarbamoyl-2-oxazoline,
2-methylallylcarbamoyl-2-oxazoline,
2-crotylcarbamoyl-2-oxazoline,
2-methallylcarbamoyl-2-oxazoline,
2-dicrotylcarbamoyl-2-oxazoline,
2-dimethallylcarbamoyl-2-oxazoline, and

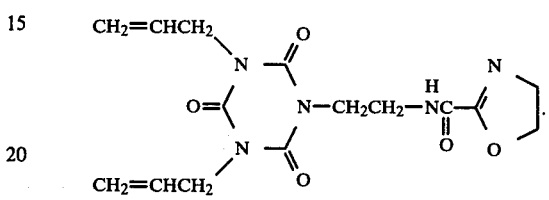

Among these compounds, 2-phenylcarbamoyl-2-oxazoline and 2-diethylcarbamoyl-2-oxazoline are preferred.

5,6-Dihydro-4H,1,3-oxazines of formula (1-b)

2-Methylcarbamoyl-5,6-dihydro-4H,1,3-oxazine,
2-ethylcarbamoyl-5,6-dihydro-4H,1,3-oxazine,
2-propylcarbamoyl-5,6-dihydro-4H,1,3-oxazine,
2-isopropylcarbamoyl-5,6-dihydro-4H,1,3-oxazine,
2-butylcarbamoyl-5,6-dihydro-4H,1,3-oxazine,
2-pentylcarbamoyl-5,6-dihydro-4H,1,3-oxazine,
2-hexylcarbamoyl-5,6-dihydro-4H,1,3-oxazine,
2-octylcarbamoyl-5,6-dihydro-4H,1,3-oxazine,
2-phenylcarbamoyl-5,6-dihydro-4H,1,3-oxazine,
2-tolylcarbamoyl-5,6-dihydro-4H,1,3-oxazine,
2-naphthylcarbamoyl-5,6-dihydro-4H,1,3-oxazine,
2-dimethylcarbamoyl-5,6-dihydro-4H,1,3-oxazine,
2-diethylcarbamoyl-5,6-dihydro-4H,1,3-oxazine,
2-methylethylcarbamoyl-5,6-dihydro-4H,1,3-oxazine,
2-phenylmethylcarbamoyl-5,6-dihydro-4H,1,3-oxazine,
2-phenylethylcarbamoyl-5,6-dihydro-4H,1,3-oxazine,
2-dimethylcarbamoyl-4,4-dimethyl-5,6-4H,1,3-oxazine,
2-diethylcarbamoyl-4,5-dimethyl-5,6-dihydro-4H,1,3-oxazine,
2-phenylcarbamoyl-4,4-dimethyl-5,6-dihydro-4H,1,3-oxazine,
2-allylcarbamoyl-5,6-dihydro-4H,1,3-oxazine,
2-methallylcarbamoyl-5,6-dihydro-4H,1,3-oxazine,
2-crotylcarbamoyl-5,6-dihydro-4H,1,3-oxazine,
2-diallylcarbamoyl-5,6-dihydro-4H,1,3-oxazine,
2-dimethallylcarbamoyl-5,6-dihydro-4H,1,3-oxazine,
2-dicrotylcarbamoyl-5,6-dihydro-4H,1,3-oxazine, and

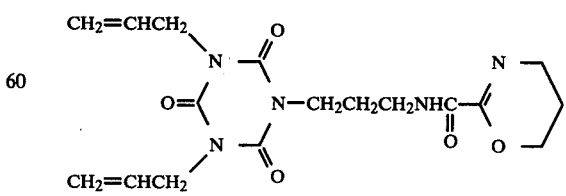

Among these compounds, 2-phenylcarbamoyl-5,6-dihydro-4H,1,3-oxazine and 2-diethylcarbamoyl-5,6-dihydro-4H,1,3-oxazine are preferred.

The compound of formula (1-b) can be produced from a compound of the following formula

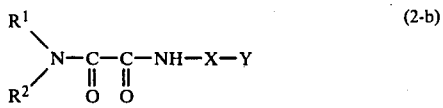 (2-b)

wherein $R^1$, $R^2$, and X are as defined in formula (1-a) and Y is as defined in formula (2-a), in the same way as in the production of the compound of formula (1-a) from the compound of formula (2-a).

2-Oxazolines of formula (1-c)

2-Methoxy-2-oxazoline,
2-ethoxy-2-oxazoline,
2-propoxy-2-oxazoline,
2-butoxy-2-oxazoline,
2-pentyloxy-2-oxazoline,
2-hexyloxy-2-oxazoline,
2-heptyloxy-2-oxazoline,
2-octyloxy-2-oxazoline,
2-nonyloxy-2-oxazoline,
2-decyloxy-2-oxazoline,
2-cyclopentyloxy-2-oxazoline,
2-cyclohexyloxy-2-oxazoline,
2-allyloxy-2-oxazoline,
2-methallyloxy-2-oxazoline, and
2-crotyloxy-2-oxazoline.

Among these compounds, 2-butoxy-2-oxazoline and 2-pentyloxy-2-oxazoline are preferred.

5,6-Dihydro-4H,1,3-oxazines of formula (1-c)

2-Methoxy-5,6-dihydro-4H,1,3-oxazine,
2-ethoxy-5,6-dihydro-4H,1,3-oxazine,
2-propoxy-5,6-dihydro-4H,1,3-oxazine,
2-butoxy-5,6-dihydro-4H,1,3-oxazine,
2-pentyloxy-5,6-dihydro-4H,1,3-oxazine,
2-hexyloxy-5,6-dihydro-4H,1,3-oxazine,
2-heptyloxy-5,6-dihydro-4H,1,3-oxazine,
2-octyloxy-5,6-dihydro-4H,1,3-oxazine,
2-nonyloxy-5,6-dihydro-4H,1,3-oxazine,
2-decyloxy-5,6-dihydro-4H,1,3-oxazine,
2-cyclopentyloxy-5,6-dihydro-4H,1,3-oxazine,
2-cyclohexyloxy-5,6-dihydro-4H,1,3-oxazine,
2-allyloxy-5,6-dihydro-4H,1,3-oxazine,
2-methallyloxy-5,6-dihydro-4H,1,3-oxazine, and
2-crotyloxy-5,6-dihydro-4H,1,3-oxazine.

Among these compounds, 2-butoxy-5,6-dihydro-4H,1,3-oxazine and 2-pentyloxy-5,6-dihydro-4H,1,3-oxazine are preferred.

The compound of formula (1-c) can be produced from a compound of formula (2-c)

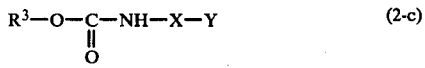 (2-c)

wherein $R^3$ and X are as defined in formula (1) and Y is as defined in formula (2-a), in the same way as in the preparation of the compound of formula (1-a) from the compound of formula (2-a).

The compounds of formula (1) can be used either singly or as a mixture of two or more in the process of this invention.

[C] Reaction of this invention and the reaction conditions

The process of this invention is performed by reacting the saturated polyester with the monocyclic imino ether at an elevated temperature. The reaction proceeds as schematically shown below.

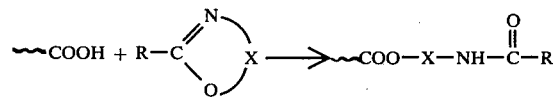

wherein ∼∼∼ represents the molecular chain of the saturated polyester.

As is seen from the above reaction scheme, the reaction in accordance with the process of this invention causes the blocking of carboxyl group at the terminal of the molecular chain of the saturated polyester and the reduction of the terminal carboxyl group content.

By contacting the saturated polyester intimately with the monocyclic imino ether at an elevated temperature, the reaction is performed in the molten state at a temperature above the melting point of the saturated polyester temperature above a point at which the saturated polyester melts, or in the solid phase at a temperature below a point at which the saturated polyester melt but at an elevated temperature at which the reaction proceeds sufficiently. The reaction in the molten state is carried out at a temperature at least 10° C. higher than the temperature at which the saturated polyester melts, preferably at a temperature at least 15° C. higher than the temperature at which the saturated polyester melts.

The reaction may be carried out at elevated, atmospheric or reduced pressures. The reaction in accordance with this invention proceeds very rapidly. Generally, it proceeds sufficiently if there is a period of about 15 minutes after the molten saturated polyester and the monocyclic imino ether contacted each other intimately. Investigations of the present inventors have shown that in some cases, the reaction in accordance with this invention proceeds a period of as short as about 30 seconds, and within such a short period of time, a saturated polyester having its terminal carboxyl group content reduced to the desired degree can be obtained.

The reaction time required in the process of this invention accounts for the very rapid proceeding of the reaction. In actual operations, however, it is permissible to mix the molten saturated polyester and bis-cyclic imino ether for a longer period of time than the above-mentioned reaction time, and in some cases, this is preferred. In practice, therefore, the reaction time is generally from about 30 seconds to about 30 minutes, preferably from about 1 minute to about 15 minutes, especially preferably from about 2 minutes to about 10 minutes.

The reaction is preferably carried out in an inert atmosphere, for example in a nitrogen atmosphere.

The reaction in accordance with this invention in which the saturated polyester is in the molten state may be carried out in any reaction apparatus which can afford a reaction system capable of maintaining the saturated polyester in the molten state. For example, the reaction can be carried out in a polycondensation reactor for saturated polyesters, or in a melt-molding machine.

In the polycondensation reactor, the reaction can be performed by adding a predetermined amount of the monocyclic imino ether to the molten saturated polyester resulting from the polycondensation carried out until it has such a degree of polymerization as to render it fiberforming. In the melt-molding machine, a separately prepared mixture of the saturated polyester and a predetermined amount of the monocyclic imino ether is fed and reacted. Or the saturated polyester and a predetermined amount of the monocyclic imino ether are separately charged into the melt-molding machine, and then reacted there.

When the reaction is carried out in the polycondensation reactor, a saturated polyester having a reduced terminal carboxyl group content is formed by the process of this invention. Accordingly, molded articles such as fibers or films can be produced from the resulting molten saturated polyester having a reduced terminal carboxyl group content. Alternatively, the molten saturated polyester obtained may be first converted into a molding material (e.g., chips), and then melted and molded in a melt-molding machine.

On the other hand, when the reaction is carried out in a melt-molding machine, molded articles of a saturated polyester having a reduced terminal carboxyl group content can be obtained from the starting saturated polyester only by a melt-molding operation because the reaction in accordance with this invention takes place within the molding machine.

It is possible also to perform the reaction of this invention in a polymerization reactor, and subject the resulting saturated polyester having a reduced terminal carboxyl group content further to the reaction of this invention in a melt-molding machine.

Or the saturated polyester having a reduced terminal carboxyl group content obtained by performing the reaction of this invention in the melt-molding machine may be stored as a molding material without directly molding it in the melt-molding machine, and may be melted and molded in the melt-molding machine as required.

The reaction in this invention may also be carried out in the solid state. This reaction is performed by heating the saturated polyester and the monocyclic imino ether in the intimately contacted state to a temperature below the melting point of the saturated polyester.

The reaction is carried out at a temperature of, preferably, from a point about 80° C. below the melting point of the saturated polyester to its melting point at atmospheric or reduced pressure, preferably in an inert atmosphere such as nitrogen.

The intimately contacted state of the saturated polyester and the mono-cyclic imino ether can be created, for example, by insufficiently reacting the saturated polyester and the mono-cyclic imino ether in the molten state so that the saturated polyester still sufficiently has terminal carboxyl groups and an unreacted imino ether group still exists; or by contacting the saturated polyester with the mono-cyclic imino ether in the liquid or gaseous state or with a solution of the mono-cyclic imino ether in an organic solvent capable of dissolving the mono-cyclic imino ether, such as an aromatic hydrocarbon (e.g., toluene or xylene).

The reaction of this invention in the solid phase is advantageous when it is performed after the saturated polyester has been molded into fibers, films, etc. The molding operation in this case can be performed by using molding conditions for ordinary saturated polyesters. Generally, it is advantageous to apply the process of this invention to a molded article because the reaction in accordance with the process of this invention for reducing the carboxyl group content is carried out after the melt-molding operation which results in an increase in the content of carboxyl groups owing to heat decomposition.

Stoichiometrically, the reaction in accordance with this invention proceeds between 1 equivalent of the terminal carboxyl groups of the saturated polyester and 1 mole of the mono-cyclic imino ether, as is clearly seen from the reaction scheme given hereinabove.

The process of this invention, however, is directed to the production of a saturated polyester having a reduced terminal carboxyl group content, and not all of the terminal carboxyl groups of the saturated polyesters used need to react with the mono-cyclic imino ether. Accordingly, even when a stoichiometrical amount of the mono-cyclic imino ether is used with regard to the terminal carboxyl groups of the saturated polyester, or when the mono-cyclic imino ether is used in an amount smaller than its stoichiometrical amount with regard to the terminal carboxyl groups of the saturated polyester, not all of the terminal carboxyl groups of the saturated polyester are consumed by the process of this invention. On the other hand, when the mono-cyclic imino ether is used in an amount exceeding its stoichiometrical amount with respect to the terminal carboxyl groups of the saturated polyester, and almost all of these terminal carboxyl groups are consumed, imino ether groups based on the mono-cyclic imino ether partly remain unreacted in the resulting saturated polyester having a reduced terminal carboxyl group content.

The process of this invention essentially embraces the aforesaid embodiments.

The process of this invention is performed by using the monocyclic imino ether preferably in a proportion of 0.05 to 10 moles, more preferably 0.05 to 5 moles, especially 0.1 to 2 moles, per equivalent of the terminal carboxyl groups of the saturated polyester.

From the reaction of polyethylene terephthalate with 2-phenylcarbamoyl-2-oxazoline, a typical monocyclic imino ether, the present inventors have ascertained that up to about 90% of the entire terminal carboxyl groups of the saturated polyester can be blocked with an optimum amount of the monocyclic imino ether under the optimum conditions by the process of this invention.

8 D] Embodiments of the process of this invention

The essence of the present invention lies in the rapid production of a substantially linear saturated polyester having a reduced terminal carboxyl group content by the reaction of the terminal carboxyl groups of the molecular chain of the saturated polyester with the monocyclic imino ether.

Preferred embodiments of the present invention having this essence are typified by (1) an embodiment wherein the saturated polyester and the monocyclic imino ether are used as such as reaction materials, and (2) an embodiment wherein the saturated polyester and a thermoplastic resin containing the monocyclic imino ether in the unreacted state are used as reaction materials.

These embodiments are described in detail below.

Embodiment (1)

According to this embodiment, a saturated polyester having a reduced terminal carboxyl group content as a molding material or a molded article composed of the saturated polyester is produced by reacting the saturated polyester with the monocyclic imino ether in the molten state in a polymerization reactor or a melt-molding machine, or reacting them while the saturated polyester is maintained in the solid phase.

In performing the reaction in the polymerization reactor, a predetermined amount of the monocyclic imino ether is added to the molten saturated polyester, and the saturated polyester and the monocyclic imino ether are contacted intimately with each other by stirring, for example.

In performing the reaction in the melt molding machine, a predetermined amount of the monocyclic imino ether is mixed with a molding material of the saturated polyester, and the saturated polyester is melted in the molding machine to contact the two intimately. Or the imino ether is added to the saturated polyester residing in the melt-molding machine through an opening for feeding the monocyclic imino ether, and the two are intimately contacted with each other.

When the monocyclic imino ether is to be reacted with the saturated polyester in the solid state, the monocyclic imino ether in the form of a liquid, a gas or a solution in an organic solvent such as toluene or xylene is contacted with the saturated polyester in the form of a molding material or a molded article at an elevated temperature. Alternatively, the contacting is carried out at a lower temperature, and then they are treated at an elevated temperature.

Embodiment (2)

According to this embodiment, the monocyclic imino ether used in the reaction is included in the unreacted state in a thermoplastic resin, and the thermoplastic resin and the saturated polyesters are melted and mixed to produce a saturated polyester having a reduced terminal group content and containing the thermoplastic resin, or a molded article of the saturated polyester containing the thermoplastic resin.

Accordingly, this method is a so-called master batch method in which a thermoplastic resin containing a large amount of the monocyclic imino ether capable of reacting with the terminal carboxyl groups of the saturated polyester is first prepared, and as required, is mixed in a predetermined amount of the saturated polyester.

The thermoplastic resin may, for example, include not only the aforesaid aromatic polyesters, aliphatic polyesters and aromatic polyester ethers, but also polycarbonates, polyamides, polyolefins, polyethers and polysulfones.

Specific examples of the saturated polyesters used as the thermoplastic resin may be the same as those exemplified hereinabove as the starting saturated polyester. Specific examples of the other thermoplastic resins are polycarbonates derived from 2,2-bis(4-hydroxyphenyl)-propane or 1,1-bis(4-hydroxyphenyl)-cyclohexane; polyolefins such as polyethylene, polypropylene, polystyrene or poly(trimethyl pentene-1); polyamides such as poly-ε-capramide and polyhexamethylene adipamide; and polyethers such as polyoxyethylene glycol or polyoxytetramethylene glycol.

In preparing a master polyester consisting of a saturated polyester such as an aromatic or aliphatic polyester, preferably the former, and the mono-cyclic imino ether, the amount of the mono-cyclic imino ether should be at least equimolar to the equivalent weight of the terminal carboxyl groups of the saturated polyester.

When thermoplastic resins other than the polyesters are used and they have terminal carboxyl groups capable of reacting with the mono-cyclic imino ether, they may be mixed with an excess of the monocyclic imino ether in the same manner as described above. When the thermoplastic resins do not contain groups capable of reacting with the monocyclic imino ether, a master polymer containing the monocyclic imino ether in the unreacted state can be obtained without using the monocyclic imino ether in excess.

Desirably, the master polymer is prepared in a melt-extruder in an inert atmosphere at atmospheric pressure to elevated pressure.

The master polymer so produced is used in an amount corresponding to a predetermined amount of the cyclic imino ether groups, and is mixed and melted with the saturated polyester having terminal carboxyl groups at a temperature above the melting points of the saturated polyester and the master polymer, preferably in a melt-molding machine. The mixture is then subjected to the reaction of this invention to afford a saturated polyester having a reduced terminal carboxyl group content. If desired, the resulting polymer in the molten state may be directly converted to a molded article.

When a thermoplastic resin other than the saturated polyester is used as the master polymer, the resulting saturated polyester having a reduced terminal carboxyl group content or a molded article composed of it contains the other thermoplastic resin.

Generally, when the master polymer is used, it is desirable to include the monocyclic imino ether in the master polymer in such an amount that the amount of the master polymer is at least 0.1 part by weight per part by weight of the saturated polyester.

Thus, for example, the monocyclic imino ether is included in the master batch in an amount of about 3 to about 100% by weight, preferably about 4 to about 50% by weight, more preferably about 5 to about 30% by weight, based on the thermoplastic resin.

Thus, the present invention provides a saturated polyester having a reduced terminal carboxyl group content and having excellent wet heat stability, and a molded article composed of it.

The saturated polyester obtained by the present invention can be fabricated into various articles, for example fibers, films, tubes, sheets, receptacles, machine component parts (automobiles, electrical appliances, machinery, therapeutic instruments, etc.), and household and industrial miscellaneous articles. These molded articles may also be foamed ones. Among these articles, the fibers may find applications in apparel, rubber structure reinforcing materials (tire cords, belt materials, etc.), and industrial materials such as fishing nets and filter materials, and the films are useful for magnetic recording, electrical insulation, packaging, agriculture (for green houses), lamination, etc.

These articles of saturated polyester can be produced by techniques and operations which are known in the production of molded articles from saturated polyesters. For example, they can be produced by extrusion molding, injection molding, compression molding, etc.

In the case of the production of fibers for example, the spinning is carried out at a temperature in the range of a point about 10° C. above the melting temperature of the saturated polyester to a point about 50° C. above it. In the case of an aromatic polyester having a high intrinsic viscosity of at least about 0.8, such as polyethylene terephthalate, the melt-spinning is carried out by using a spinning cylinder having a heating area at 290° to 400° C. immediately below the spinneret. The resulting undrawn filaments are drawn at 70° to 100° C. in a first stage and at 180° to 230° C. in a second stage so that the total draw ratio in the first and second stages is 4 to 6 times. The drawn filaments are usually heat-treated at a temperature higher than the drawing temperature.

As another example, a film may be produced by melting the polyester and forming it into a film at a temperature of, for example, 260° to 340° C., and the resulting unstretched film is wound up as a final product. Or the unstretched film is stretched to 2.5 to 5.0 times, preferably 2.8 to 4.5 times, in the advancing direction of the film at a temperature of 70° to 120° C., and if required, further stretched to 2.5 to 5.0 times, preferably 2.8 to 4.5 times, in a direction at right angles to the advancing direction of the film. If further required, the stretched film is heat-set at a temperature of 110° to 240° C., preferably 120° to 230° C.

If desired, the molded articles of the saturated polyester obtained by the process of this invention may contain reinforcing materials, fillers, fire retardants, fire-retarding assistants, antioxidants, heat stabilizers, light stabilizers, plasticizers, lubricants, antistatic agents, nucleating agents, mold releasing agents, coloring agents, etc. The reinforcing materials are, for example, fibrous materials such as glass fibers, asbestos fibers, carbon fibers and potassium titanate fibers, and small flaky materials such as glass flakes and mica. The other additives mentioned above are well known in the field of saturated polyester articles.

As stated in detail hereinbelow, the present invention provides a process for rapidly producing a saturated polyester having a reduced terminal carboxyl group content or a molded article composed of it without substantial formation of by-products. The resulting saturated polyester of this invention having a reduced terminal carboxyl group content has excellent wet heat stability.

The following Examples and Comparative Examples illustrate the present invention in more detail. It should be understood however that the invention is in no way limited to these specific examples.

In these examples, all parts are by weight, and the contents of terminal carboxyl groups and terminal hydroxyl groups of aromatic polyesters were measured by the method of A. Conix described in Makromol. Chem. 26, 226 (1958).

EXAMPLES 1 to 6 and COMPARATIVE EXAMPLE 1

One hundred parts of polyethylene terephthalate having an intrinsic viscosity of 0.68 and a terminal carboxyl group content of 38 equivalents/$10^6$ g was melted at 280° C. in a stream of nitrogen in a glass polymerization reactor, and each of the compounds (1-a) shown in Table 1 in the indicated amounts was added. The mixture was reacted. Coloration of the polymer did not substantially occur during the reaction. After a lapse of 3 minutes from the initiation of the reaction, the intrinsic viscosity and terminal carboxyl group content of polymer changed as shown in Table 1.

Table 1 also shows the results obtained with respect to a comparative example in which the compound of formula (1-a) was not added.

It is seen from Table 1 that in the present invention, the compound (1-a) reacted with the polyester under the polymer melting conditions to reduce the terminal carboxyl group content of the polyester greatly.

TABLE 1

| Example | Compound (1-a) | Amount (parts) | Intrinsic viscosity | Terminal [COOH] (eq./$10^6$g) |
|---|---|---|---|---|
| 1 | 2-N-Phenylamino-2-oxazoline | 1.0 | 0.60 | 8 |
| 2 | 2-N,N'-Diethylamino-2-oxazoline | 0.7 | 0.68 | 8 |
| 3 | 2-N,N'-Diethylamino-2-oxazoline | 1.0 | 0.67 | 5 |
| 4 | 2-N,N'-Dibutylamino-oxazoline | 1.2 | 0.66 | 6 |
| 5 | 2-N-Phenylamino-5,6-dihydro-4H,1,3-oxazine | 1.0 | 0.61 | 9 |
| 6 | 2-N,N'-Diethylamino-5,6-dihydro-4H,1,3-oxazine | 0.9 | 0.67 | 7 |
| Comparative Example 1 | None | — | 0.64 | 44 |

EXAMPLES 7 to 12 and COMPARATIVE EXAMPLE 2

One hundred parts of polytetramethylene terephthalate having an intrinsic viscosity of 0.74 and a terminal carboxyl group content of 43 equivalents/$10^6$ g was dry-blended with a predetermined amount of each of the compounds (1-a) shown in Table 2. The mixture was melt-extruded into a sheet by an extruder at 240° C. with an average residence time of about 3 minutes. The intrinsic viscosity and terminal carboxyl group content of the resulting sheet are shown in Table 2.

Table 2 also shows the results of a comparative example in which the compound (1-a) was not added.

It is seen from Table 2 that while the terminal carboxyl group content of the polymer increased in the comparative example, it was markedly reduced in the case of the present invention.

TABLE 2

| Example | Compound (1-a) | Amount (parts) | Intrinsic viscosity | Terminal [COOH] (eq./$10^6$g) |
|---|---|---|---|---|
| 7 | 2-N-Phenylamino-2-oxazoline | 0.8 | 0.78 | 7 |
| 8 | 2-N-Phenylamino-2-oxazoline | 1.4 | 0.76 | 4 |
| 9 | 2-N,N-diethylamino-2-oxazoline | 0.8 | 0.77 | 5 |
| 10 | 2-N,N-Dibutylamino-2-oxazoline | 1.2 | 0.76 | 4 |
| 11 | 2-N-Phenylamino-5,6-dihydro-4H,1,3-oxazine | 1.0 | 0.78 | 6 |
| 12 | 2-N,N-Diethylamino-5,6-dihydro-4H,1,3-oxazine | 1.0 | 0.76 | 5 |
| Comparative Example 2 | None | — | 0.71 | 48 |

EXAMPLE 13 and COMPARATIVE EXAMPLE 3

A sheet (thickness about 500 microns) of polyethylene terephthalate (intrinsic viscosity 0.64, terminal carboxyl group content 32 equivalents/$10^6$ g) was dipped for 30 minutes in a toluene solution containing about 2% by weight of 2-N-phenylamino-2-oxazoline at the refluxing temperature of the toluene. Then, the sheet was withdrawn, dried, and heat-treated in the air at 180° C. for 1 hour. The heat-treated sheet had an intrinsic viscosity of 0.62 and a terminal carboxyl group content of 6 equivalents/$10^6$ g.

For comparison, when the same polyester sheet was heat-treated under the same conditions as above without dipping it in the toluene solution, the treated sheet had an intrinsic viscosity of 0.62 and a terminal carboxyl group content of 36 equivalents/$10^6$ g.

EXAMPLES 14 to 19

Example 1 was repeated except that each of the compounds (1-b) shown in Table 3 was used instead of the compound (1-a). The properties of the resulting polyethylene terephthalate are shown in Table 3.

TABLE 3

| Example | Compound (1-b) | Amount (parts) | Properties of the polymer 3 minutes after the initiation of the reaction | |
|---|---|---|---|---|
| | | | Intrinsic viscosity | Terminal [COOH] (eq./$10^6$g) |
| 14 | 2-Phenylcarbamoyl-2-oxazoline | 1.0 | 0.65 | 6 |
| 15 | 2-Phenylcarbamoyl-2-oxazoline | 1.5 | 0.64 | 4 |
| 16 | 2-Diethylcarbamoyl-2-oxazoline | 1.5 | 0.66 | 3 |
| 17 | 2-Ethylcarbamoyl-2-oxazoline | 1.0 | 0.64 | 5 |
| 18 | 2-Diallylcarbamoyl-2-oxazoline | 1.2 | 0.66 | 3 |
| 19 | 2-Phenylcarbamoyl-5,6-dihydro-4H,1,3-oxazine | 1.0 | 0.64 | 7 |
| Comparative Example 1 | None | — | 0.64 | 44 |

EXAMPLES 20 to 24

Example 7 was repeated except that each of the compounds (1-b) shown in Table 4 was used instead of the compound (1-a).

The properties of the resulting polytetramethylene terephthalate sheets are shown in Table 4.

TABLE 4

| Example | Compound (1-b) | Amount (parts) | Properties of the extruded sheet | |
|---|---|---|---|---|
| | | | Intrinsic viscosity | Terminal [COOH] (eq./$10^6$g) |
| 20 | 2-Phenylcarbamoyl-2-oxazoline | 1.2 | 0.71 | 12 |
| 21 | 2-Phenylcarbamoyl-5,6-dihydro-4H,1,3-oxazine | 1.0 | 0.71 | 14 |
| 22 | 2-Diethylcarbamoyl-2-oxazoline | 1.0 | 0.72 | 9 |
| 23 | 2-Allylcarbamoyl-2-oxazoline | 1.0 | 0.72 | 11 |
| 24 | 2-Diethylcarbamoyl-5,6-dihydro-4H,1,3-oxazine | 1.0 | 0.72 | 9 |
| Comparative Example 2 | None | — | 0.71 | 48 |

EXAMPLE 25

A sheet (about 500 microns thick) of polyethylene terephthalate (intrinsic viscosity 0.64, terminal carboxyl group content 32 equivalents/$10^6$ g) was dipped for 1 hour in a dioxane solution containing about 5% of 2-phenylcarbamoyl-2-oxazoline at the refluxing temperature of the dioxane. The sheet was withdrawn, washed with water, dried, and then heat-treated in the air at 210° C. for 1 hour. The heat-treated sheet had an intrinsic viscosity of 0.63 and a terminal carboxyl group content of 9 equivalents/$10^6$ g.

For comparison, the above sheet was heat-treated under the same conditions as above except that it was not dipped in the dioxane solution. The heat-treated sheet had an intrinsic viscosity of 0.62 and a terminal carboxyl group content of 36 equivalents/$10^6$ g.

EXAMPLES 26 to 31

Example 1 was repeated except that each of the compounds (1-c) shown in Table 4 was used instead of the compound (1-a). The properties of the resulting polyethylene terephthalate are shown in Table 5.

TABLE 5

| Example | Compound (1-c) | Amount (parts) | Properties of the polyester after the reaction | |
|---|---|---|---|---|
| | | | Intrinsic viscosity | Terminal [COOH] (eq./$10^6$g) |
| 26 | 2-Butoxy-2-oxazoline | 0.8 | 0.65 | 9 |
| 27 | 2-Pentyloxy-2-oxazoline | 0.7 | 0.65 | 12 |
| 28 | " | 1.0 | 0.62 | 6 |
| 29 | 2-Hexyloxy-2-oxazoline | 1.0 | 0.64 | 8 |
| 30 | 2-Butoxy-5,6-dihydro-4H,1,3-oxazine | 0.8 | 0.63 | 9 |
| 31 | 2-Pentyloxy-5,6-dihydro-4H,1,3-oxazine | 1.0 | 0.64 | 8 |
| Comparative Example 1 | None | — | 0.64 | 44 |

EXAMPLES 32 to 37

Example 7 was repeated except that each of the compounds (1-c) described in Table 6 was used instead of the compound (1-a).

The properties of the polytetramethylene terephthalate sheet are shown in Table 6.

TABLE 6

| Example | Compound (1-c) | Amount (parts) | Properties of the extruded sheet | |
|---|---|---|---|---|
| | | | Intrinsic viscosity | Terminal [COOH] (eq./$10^6$g) |
| 32 | 2-Ethoxy-2-oxazoline | 0.7 | 0.72 | 9 |
| 33 | 2-Butoxy-2-oxazoline | 0.9 | 0.70 | 7 |
| 34 | 2-Pentyloxy-2-oxazoline | 0.8 | 0.71 | 14 |
| 35 | " | 1.0 | 0.70 | 6 |
| 36 | 2-Ethoxy-5,6-dihydro-4H,1,3-oxazine | 0.8 | 0.70 | 8 |
| 37 | 2-Butoxy-5,6-dihydro-4H,1,3-oxazine | 1.0 | 0.71 | 7 |
| Comparative Example 2 | None | — | 0.71 | 48 |

EXAMPLE 38

A sheet (about 500 microns thick) of polyethylene terephthalate (intrinsic viscosity 0.64, terminal carboxyl group content 32 equivalents/$10^6$ g) was dipped for 30 minutes in a toluene solution containing about 2% by weight of 2-pentyloxy-2-oxazoline. Then, the sheet was taken out, dried, and heat-treated in the air at 180° C. for 1 hour. The heat-treated sheet had an intrinsic viscosity of 0.61 and a terminal carboxyl group content of 7 equivalents/$10^6$ g.

For comparison, the sheet was heat-treated under the same conditions as above without dipping it in the toluene solution. The heat-treated sheet had an intrinsic viscosity of 0.62 and a terminal carboxyl group content of 36 equivalents/$10^6$ g.

EXAMPLES 39 to 41 and COMPARATIVE EXAMPLE 3

One hundred parts of chips of polytetramethylene terephthalate having an intrinsic viscosity of 0.72 and a terminal carboxyl group content of 27 equivalents/$10^6$ g was dry-blended with a predetermined amount of each of the monocyclic imino ethers shown in Table 7, and the mixture was melt-extruded by an extruder at about 200° C. with an average residence time of about 4 minutes. The intrinsic viscosity and terminal carboxyl group content of the resulting polymer are shown in Table 7.

Table 7 also gives the results of a comparative example in which no monocyclic imino ether was added.

TABLE 7

| Example | Monocyclic imino ether | Amount (parts) | Intrinsic viscosity | Terminal [COOH] (eq./$10^6$g) |
|---|---|---|---|---|
| 39 | 2-N-Cyclohexylamino-2-oxazoline | 0.6 | 0.71 | 8 |
| 40 | 2-Benzylcarbamoyl-2-oxazoline | 0.75 | 0.69 | 6 |
| 41 | 2-Hexyloxy-2-oxazoline | 0.6 | 0.69 | 7 |
| Comparative Example 3 | None | — | 0.70 | 32 |

EXAMPLE 42 to 44 and COMPARATIVE EXAMPLE 4

One hundred parts of polyethylene terephthalate having copolymerized therewith 15 mole%, based on the total acid component, of isophthalic acid (intrinsic viscosity 0.80, terminal carboxyl group content 32 equivalents/$10^6$ g) was melted at 270° C. in a stream of nitrogen in a glass polymerization vessel, and then a predetermined amount of each of the monocyclic imino ethers shown in Table 8 was addd. With stirring, they were reacted for 3 minutes under atmospheric pressure. The intrinsic viscosities and terminal carboxyl group contents of the resulting polymers are shown in Table 8.

TABLE 8

| Example | Monocyclic imino ether | Amount (parts) | Intrinsic viscosity | Terminal [COOH] (eq./$10^6$g) |
|---|---|---|---|---|
| 42 | N-2-Oxazolinyl-piperidine | 0.8 | 0.76 | 4 |
| 43 | 2-N-Cyclohexyl-carbamoyl-2-oxazoline | 1.1 | 0.73 | 6 |
| 44 | 2-Cyclohexyloxy-2-oxazoline | 0.9 | 0.72 | 6 |
| Comparative Example 4 | None | — | 0.74 | 39 |

Table 8 shows the results of a comparative example in which no monocyclic imino ether was added.

EXAMPLES 45 to 47 and COMPARATIVE EXAMPLE 5

A reactor equipped with a stirrer, a distillation device and a nitrogen introducing tube was charged with 55.8 parts of dimethyl terephthalate, 38.8 parts of tetramethylene glycol, 90.8 parts of polyoxytetramethylene glycol having an average molecular weight of 2000 (60% by weight of the resulting polyester) and 0.025 part of tetrabutoxy titanate. They were heated to 180° to 220° C., and methanol formed as a result of the reaction was distilled off. After about 90% of the theoretical amount of methanol distilled off, the temperature was raised to 240° C., and the reaction was carried out at atmospheric pressure for 30 minutes. Then, the reaction was performed for 30 minutes at a pressure of 30 mmHg (absolute). Furthermore, the polymerization was carried out for 180 minutes in a high vacuum of 0.1 to 0.3 mmHg. The resulting polymer had a reducing viscosity of 1.94 and a terminal carboxyl group content of 29 equivalents/$10^6$ g.

The resulting polyester elastomer was formed into chips, and dried. One hundred parts of the resulting polyester elastomer chips were dry-blended with a predetermined amount of each of the monocyclic imino ethers shown in Table 9. The resulting mixture was melt-extruded by an extruder at about 240° C. with an average residence time of about 3 minutes. The reducing viscosity and terminal carboxyl group content of the polymer after extrusion are shown in Table 9.

TABLE 9

| Example | Monocyclic imino ether | Amount (parts) | Reducing viscosity | Terminal [COOH] (eq./$10^6$g) |
|---|---|---|---|---|
| 45 | 2-N,N-Diethylamino-5,6-dihydro-4H,1,3-oxazine | 0.6 | 1.82 | 3 |
| 46 | 2-Phenylcarbamoyl-2-oxazoline | 0.7 | 1.80 | 4 |
| 47 | 2-Hexyloxy-5,6-di-hydro-4H,1,3-oxazine | 0.7 | 1.78 | 6 |
| Comparative Example 5 | None | — | 1.80 | 34 |

Table 9 also shows the results of a comparative example in which no monocyclic imino ether was added.

EXAMPLES 48 to 50

One hundred parts of each of the polyesters shown in Table 10 was put into a glass polymerization vessel, and melted at each of the temperatures shown in Table 10 in a stream of nitrogen. Then, with stirring, a predetermined amount of each of the monocyclic imino ethers shown in Table 10 was added, and reacted at atmospheric pressure of 5 minutes with stirring. The intrinsic viscosities and terminal carboxyl group contents of the polyesters before and after the reaction are shown in Table 10.

It is seen from the results obtained that the monocyclic imino ether in accordance with this invention reacted with the polyester within a short period of time to reduce the terminal carboxyl group of the polyester markedly.

TABLE 10

| Example | Polyester | Melting temperature (°C.) | Monocyclic imino ether (amount in parts) | Intrinsic viscosity Before reaction | Intrinsic viscosity After reaction | Terminal [COOH] (eq./10⁶g) Before reaction | Terminal [COOH] (eq./10⁶g) After reaction |
|---|---|---|---|---|---|---|---|
| 48 | Polyethylene-2,6-naphthalene dicarboxylate | 290 | 2-Dioctylcarbamoyl-2-oxazoline (1.5) | 0.68 | 0.66 | 33 | 6 |
| 49 | Polyethylene-2,6-naphthalene dicarboxylate | 290 | 2-Decyloxy-2-oxazoline (1.2) | 0.68 | 0.65 | 33 | 4 |
| 50 | Polytetramethylene-2,6-naphthalene dicarboxylate | 270 | 2-N-Phenyl-N-ethyl-amino-2-oxazoline (1.2) | 0.73 | 0.72 | 42 | 4 |

EXAMPLES 51 to 53

One hundred parts of each of the thermoplastic resins shown in Table 11 was dry-blended with 2-phenylcarbamoyl-2-oxazoline in the amounts indicated in Table 11. The mixture was melt-extruded into chips by an extruder at each of the temperatures (compounding temperatures) shown in Table 11 with an average residence time of about 1 minutes.

The resulting master polymer chips in the amounts indicated in Table 12 were mixed with 100 parts by weight of polyethylene terephthalate having an intrinsic viscosity of 0.68 and a terminal carboxyl group content of 38 equivalents/10⁶ g. The mixture was dried, and then extruded through a T-die at a temperature of about 260° C. with an average residence time of about 2.5 minutes to afford a sheet having a thickness of about 500 microns. The intrinsic viscosity and terminal carboxyl group content of the resulting sheet are shown in Table 12.

For comparison, the master polymer chips were not added, and otherwise the same procedure as above was repeated. The results are also shown in Table 12.

It is seen from the results obtained that while the terminal carboxyl group content of the molded article in the comparative example increased, the terminal carboxyl group content of the molded article obtained by using the monocyclic imino ether in accordance with the present invention decreased markedly.

TABLE 11

| Example | Thermoplastic resin | Amount of 2-phenyl-carbamoyl-2-oxazoline (parts) | Compounding temperature (°C.) |
|---|---|---|---|
| 51 | Polyethylene terephthalate (intrinsic viscosity 0.62, terminal [COOH] 22 eq./10⁶g) | 10 | 260 |
| 52 | Polytetramethylene terephthalate (intrinsic viscosity 0.73, terminal [COOH] 25 eq./10⁶g) | 15 | 230 |
| 53 | Polycarbonate derived from 2,2'-bis(4-hydroxyphenyl)-propane (Panlite L-1250, a trademark for a product of Teijin Chemical Co., Ltd.) | 12 | 260 |

TABLE 12

| Example | Amount of the master polymer (parts) | Terminal [COOH] of the extruded article (eq/10⁶g) |
|---|---|---|
| 51 | 10 | 7 |
| 52 | 8 | 4 |
| 53 | 10 | 5 |

What we claim is:

1. A process for producing a saturated polyester having a reduced terminal carboxyl group content, which comprises reacting a carboxyl-terminated, substantially linear, fiber-forming saturated polyester with a monocyclic imino ether compound of the formula

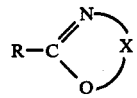  (1)

wherein R is a group of the following formula

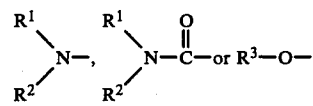

in which R¹ is a hydrogen atom, an alkyl group having 1 to 10 carbon atoms, a cycloalkyl group having 5 to 12 carbon atoms, an alkenyl group having 3 to 10 carbon atoms, a cycloalkenyl group having 5 to 12 carbon atoms, an aryl group having 6 to 12 carbon atoms or an aralkyl group having 7 to 20 carbon atoms, and R² is any one of the above groups for R¹ with the exception of the hydrogen atom, and R³ is an alkyl group having 1 to 10 carbon atoms, a cycloalkyl group having 5 to 12 carbon atoms, an alkenyl group having 3 to 10 carbon atoms, a cycoalkenyl group having 5 to 12 carbon atoms, or an aralkyl group having 7 to 20 carbon atoms, and R¹ and R² may be bonded to each other, to form together with the nitrogen atom a 5- or 6-membered ring which is non-reactive with the saturated polyester under the reaction conditions; and X is a divalent organic group non-reactive with the saturated polyester under the reaction conditions, which has two or three ring-member carbon atoms constituting the imino ether ring.

2. The process of claim 1 wherein the monocyclic imino ether compound is represented by the following formula

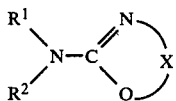 (1-a)

wherein $R^1$, $R^2$ and X are as defined therein.

3. The process of claim 2 wherein X in formula (1-a) is an ethylene or trimethylene group.

4. The process of claim 1 wherein the monocyclic imino ether compound is represented by the following formula

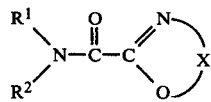 (1-b)

wherein $R^1$, $R^2$ and X are as defined therein.

5. The process of claim 4 wherein X in formula (1-b) is an ethylene or trimethylene group.

6. The process of claim 1 wherein the monocyclic imino ether compound is represented by the following formula

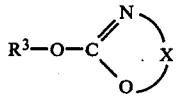 (1-c)

wherein $R^3$ and X are as defined therein.

7. The process of claim 6 wherein X in formula (1-c) is an ethylene or trimethylene group.

8. The process of claim 1 wherein the amount of the monocyclic imino ether compound is 0.05 to 10 moles per equivalent of the terminal carboxyl groups of the saturated polyester.

9. The process of claim 8 wherein the amount of the monocyclic imino ether compound is 0.05 to 5 moles per equivalent of the terminal carboxyl groups of the saturated polyester.

10. The process of claim 9 wherein the amount of the monocyclic imino ether compound is 0.1 to 2 moles per equivalent of the terminal carboxyl groups of the saturated polyester.

11. The process of claim 1 wherein the reaction is carried out at atmospheric or elevated pressures.

12. The process of claim 1 wherein the reaction is carried out at a temperature above the temperature at which the saturated polyester melts.

13. The process of claim 1 wherein the reaction is carried out at a temperature lower than the temperature at which the saturated polyester melts.

14. A saturated polyester having a reduced carboxyl group content obtained by the process of claim 1.

15. A molded article composed of the saturated polyester of claim 14.

16. The molded article of claim 15 which is in the form of fiber or film.

17. A process for producing a molded article composed of a saturated polyester having a reduced terminal carboxyl group content, which comprises intimately contacting a carboxyl-terminated, substantially linear, fiber-forming saturated polyester with a monocyclic imino ether compound represented by the formula (1) in claim 1 in a melt-molding machine at a temperature above the temperature at which the saturated polyester melts, thereby reacting the saturated polyester with the monocyclic imino ether compound, and thereafter converting the resulting molten saturated polyester having a reduced terminal carboxyl group content as such into a molded article.

18. The process of claim 17 wherein the monocyclic imino ether compound is used as included in the unreacted state in a thermoplastic resin.

19. The process of claim 18 wherein the thermoplastic resin is a saturated polyester.

20. A molded article composed of a saturated polyester having a reduced carboxyl group content obtained by the process of claim 17.

21. The molded article of claim 20 which is in the form of fiber or film.

22. A process for producing a molded article composed of a saturated polyester having a reduced carboxyl group content at least at its surface, which comprises heat-treating a molded article composed of a carboxyl-terminated, substantially linear, fiber-forming saturated polyester with a monocyclic imino ether compound represented by the formula (1) in claim 1 at an elevated temperature at which the molded article can retain its form, thereby reacting the saturated polyester with the monocyclic imino ether compound.

* * * * *